United States Patent Office 3,492,344
Patented Jan. 27, 1970

3,492,344
PROCESS FOR PRODUCING CYCLOHEXYL-
SULFAMIC ACID
Herbert L. Wehrmeister and Harold I. Yalowitz, Terre
Haute, Ind., assignors to Commercial Solvents Corporation, New York, N.Y., a corporation of Maryland
No Drawing. Filed Dec. 19, 1966, Ser. No. 602,497
Int. Cl. C07c 143/86
U.S. Cl. 260—513.6                               8 Claims

ABSTRACT OF THE DISCLOSURE

Cyclohexylsulfamic acid is produced by providing an aqueous reaction medium consisting essentially of nitrocyclohexane and zinc, tin or iron and passing sulfur dioxide into the medium in amounts sufficient to lower the pH of the medium to below about 3.3 to form cyclohexylsulfamic acid.

---

This invention relates to a process for the production of cyclohexylsulfamic acid acid. In a particular aspect, this invention relates to a one-step process for the production of cyclohexylsulfamic acid by the reaction of nitrocyclohexane and sulfur dioxide in an aqueous reaction medium in the presence of a metal selected from the group consisting of zinc, iron, and tin.

Salts of cyclohexylsulfamic acid, in particular the sodium and calcium salts, are widely employed as noncaloric sweetening agents. The commercial products are known as cyclamates. In U.S. Patent 2,850,531 to Weston et al. there is described a two-step reaction for producing cyclohexylsulfamic acid from nitrocyclohexane through the intermediate, cyclohexylhydroxylamine. The patented procedure comprises reducing nitrocyclohexane with finely divided zinc in a mildly acidic, aqueous medium of a salt of a weak base and a strong acid having a pH in the range of 4–7 to produce cyclohexylhydroxylamine; recovering the cyclohexylhydroxylamine from the aqueous medium; forming a dispersion of the cyclohexylhydroxylamine in a suitable solvent, such as benzene or water; and passing sulfur dioxide into the dispersion to obtain cyclohexylsulfamic acid. In the process at least 2 moles of zinc are employed for each mole of nitrocyclohexane. If desired, the cyclohexylsulfamic acid may be recovered from the aqueous medium as the free acid. Typically, however, the free acid is first converted to a salt by reaction with a base of the desired cation and then recovered as the salt in crystalline form using known crystallization techniques. In addition to the requirements of two separate reaction steps, the described procedure for the production of cyclohexylsulfamic acid has the disadvantage of necessitating the recovery of the cyclohexylhydroxylamine intermediate before its reaction with sulfur dioxide.

It is an object of the present invention to provide a process for the production of cyclohexylsulfamic acid.

It is a further object of the present invention to provide a simplified, one-step process for producing cyclohexylsulfamic acid by the reaction of nitrocyclohexane and surfur dioxide in an aqueous medium in the presence of a metal selected from the group consisting of zinc, tin, and iron.

Other objects and advantages of the present invention will be apparent from the specification and appended claims.

It has been discovered in accordance with the present invention that cyclohexylsulfamic acid is obtained by passing sulfur dioxide into an aqueous reaction medium consisting essentially of nitrocyclohexane, water, and a metal selected from the group consisting of zinc, tin, and iron in which the mole ratio of metal to nitrocyclohexane is preferably at least about 2:1 in amounts sufficient to lower the pH of the reaction medium to below about 3.3 and forming cyclohexylsulfamic acid.

In carrying out the process of the present invention, sulfur dioxide is passed under desired conditions of temperature and pressure into a reaction medium of nitrocyclohexane, metal, and water in amounts sufficient to lower the pH of the reaction medium to below about 3.3. The reaction medium is then maintained at the desired conditions of temperature and pressure for a period of time sufficient to effect formation of cyclohexylsulfamic acid. Cyclohexylsulfamic acid is typically formed in from about one to about eight hours.

In the process of the present invention, the temperature and pressure are controlled so as to retain sulfur dioxide in the reaction medium to permit its reaction with nitrocyclohexane. Temperatures in the range of from about 0 to about 90° C. are suitably employed. Likewise, atmospheric, superatmospheric, and subatmospheric pressures may be suitably employed. Temperatures in the range of from about 25 to about 75° C. and pressures of from about 10 to about 50 inches of water in excess of atmospheric pressure are both desirable and convenient.

In order to effect the formation of cyclohexylsulfamic acid, the amount of sulfur dioxide must be sufficient to lower the pH of the reaction medium to below about 3.3. Consequently, the amount of sulfur dioxide added to the aqueous reaction medium is a critical feature of the present invention and must be sufficient to lower the pH of the reaction medium below about 3.3 and preferably below about 2.8.

The metal employed in the process of the present invention is suitably in finely divided form and preferably is of a particle size sufficiently small to substantially completely pass a 100 mesh U.S. Standard Series screen. Because of the excellent results obtained therewith, zinc in the finely divided form known as zinc dust is preferred in the process of the present invention. The finely divided material known as zinc dust is commercially available.

The cyclohexylsulfamic acid may be recovered from the aqueous reaction medium by any suitable procedure. One such procedure involves mildly heating, as for example in the range of about 45–60° C., the cyclohexylsulfamic acid containing aqueous reaction medium under reduced pressure to effect removal of unreacted sulfur dioxide; adjusting the pH of the reaction medium upward to about 8.0 or higher with a suitable base, such as calcium hydroxide or sodium hydroxide, to precipitate metal salts and to form the desired salt of cyclohexylsulfamic acid; removing the precipitated metal salts, as for example by filtration; and crystallizing the cyclohexylsulfamic acid as the salt from tde filtered reaction medium. An alternate procedure involves adding a suitable mineral acid, as for example hydrochloric acid, to the cyclohexylsulfamic acid containing aqueous reaction medium and evaporating the thus acidified medium under reduced pressure at elevated temperatures, as for example in the range of about 40 to about 80° C., to recover the cyclohexylsulfamic acid.

The invention will be understood more fully by reference to the specific example. It is understood that the examples are presented for purposes of illustration only and are not intended as a limitation of the invention.

EXAMPLE I

A three-neck 1,500 ml. round-bottom glass flask was equipped with a stirrer, a thermometer, a gas-inlet tube, a condenser, and plugs for closing the flask. An electric heating mantle was provided for heating the reactor. To the flask were charged 500 ml. of water, 65.0 grams of nitrocyclohexane, and 68.4 grams of zinc dust. The resulting reaction medium had a pH of 8.4. The flask was closed and the reaction medium was heated to 70° C. The condenser was then attached to a rubber tube which was in turn extended into 26 inches of water to maintain a positive pressure of 26 inches of water on the system. Sulfur dioxide was bubbled through the reaction medium for approximately seven hours during which period the reaction medium was continuously agitated. The addition of sulfur dioxide resulted in a drop in the pH of the reaction medium to 2.6. After addition of sulfur dioxide the reaction mixture was held for 3.75 hours at 70° C. The flask was then placed in a water bath and cooled to approximately 25° C. Upon cooling the pH of the reaction medium dropped to 1.4. The reaction medium was permitted to separate into a lower water layer containing cyclohexylsulfamic acid and an upper oil layer of unreacted nitrocyclohexane. The layers were separated by decantation. The oil layer weighed 2.5 grams. The separated water layer contained cyclohexylsulfamic acid.

Salts of cyclohexylsulfamic acid may be prepared by neutralizing the free acid with a desired base of the desired cation. The following shows the preparation of the sodium salt of cyclohexylsulfamic acid from the cyclohexylsulfamic acid of Example 1. The calcium salt is prepared in similar manner using calcium hydroxide instead of sodium hydroxide.

To the separated cyclohexylsulfamic acid containing aqueous material of Example 1 were added 235.1 grams of an aqueous solution of sodium hydroxide (50% concentration). The addition of the aqueous sodium hydroxide resulted in the adjustment of the pH of the aqueous material containing cyclohexylsulfamic acid upward to 8.0. The aqueous material was then heated to 90° C. to remove unreacted sulfur dioxide and then filtered under vacuum to remove precipitated zinc salts. Upon cooling crystalline sodium cyclohexylulfamic acid was obtained from the filtrate. The yield of sodium cyclohexylsulfamic acid was 73.6% based on nitrocyclohexane starting material.

Additional illustrations of the preparation of sodium cyclohexylsulfamic acid are given in Table I. The products were prepared following the general procedures of Example 1.

TABLE I

| Run No. | Metal | Reaction temperature (° C.) | Yield of sodium cyclohexylsulfamate based on nitrocyclohexane (percent) |
|---|---|---|---|
| | Zinc (dust) | 0–4 | 66.8 |
| | do | 24–26 | 71.8 |
| | do | 70 | 78.5 |
| | Tin (powdered) | 70 | 40.7 |
| | Iron (powdered) | 70 | 19.4 |

The process of the present invention is also suitable for the production of sulfamic acids generally, as for example, sulfamic acids of the formula $RNHSO_3H$ wherein R is an alkyl, aryl or aralkyl radical from nitro compounds of the formula $RNO_2$ wherein R is defined as above.

Since many embodiments of this invention may be made and since many changes may be made in the embodiments described, the foregoing is intrepreted as illustrative only and the invention is defined by the appended claims.

It is claimed:

1. A process for the production of cyclohexylsulfamic acid which comprises providing a reaction medium consisting essentially of water, nitrocyclohexane, and a metal selected from the group consisting of zinc, tin, and iron, passing sulfur dioxide into said reaction medium in amounts sufficient to lower the pH of the reaction medium to below about 3.3, and forming cyclohexylsulfamic acid.

2. The process of claim 1 wherein the metal is in finely divided form and wherein the mole ratio of metal to nitrocyclohexane is at least 2:1.

3. The process of claim 2 wherein tde temperature is in the range of from about 0 to about 90° C.

4. The process of claim 3 wherein the temperature is in the range of from about 25 to about 75° C., and the pressure is from about 10 to about 50 inches of water in excess of atmospheric pressure.

5. The process of claim 2 wherein the amount of sulfur dioxide is sufficient to lower the pH of the reaction medium to below about 2.8.

6. The process of claim 2 wherein the metal is zinc in the form of zinc dust.

7. The process of claim 3 wherein the metal is tin.

8. The process of claim 3 wherein the metal is iron.

References Cited

UNITED STATES PATENTS 2,850,531  9/1958  Weston et al. _____ 260—513.6

OTHER REFERENCES

Audrieth et al., chemical reviews 26, 63–65 (1940).

DANIEL D. HORWITZ, Primary Examiner